United States Patent Office 3,427,111
Patented Feb. 11, 1969

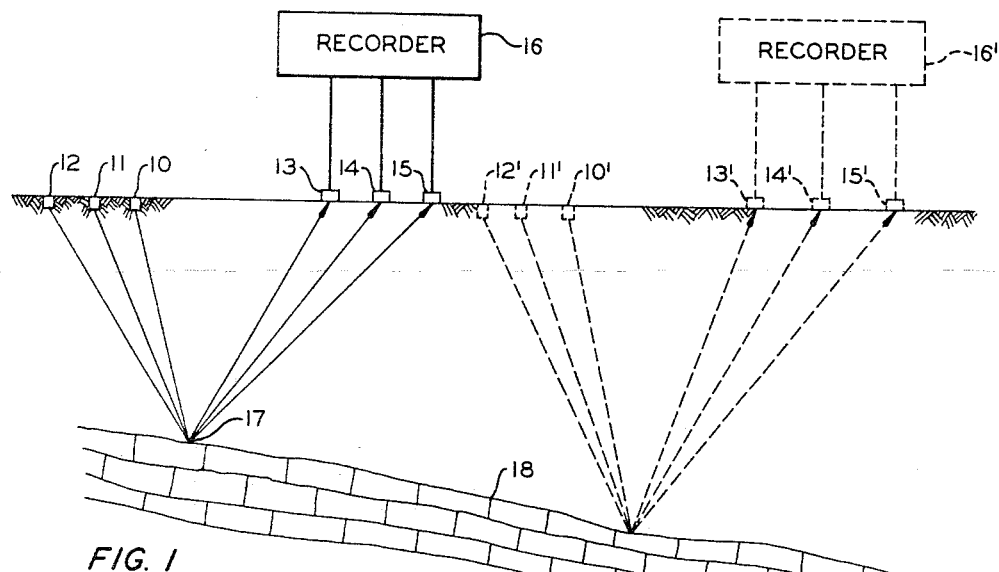
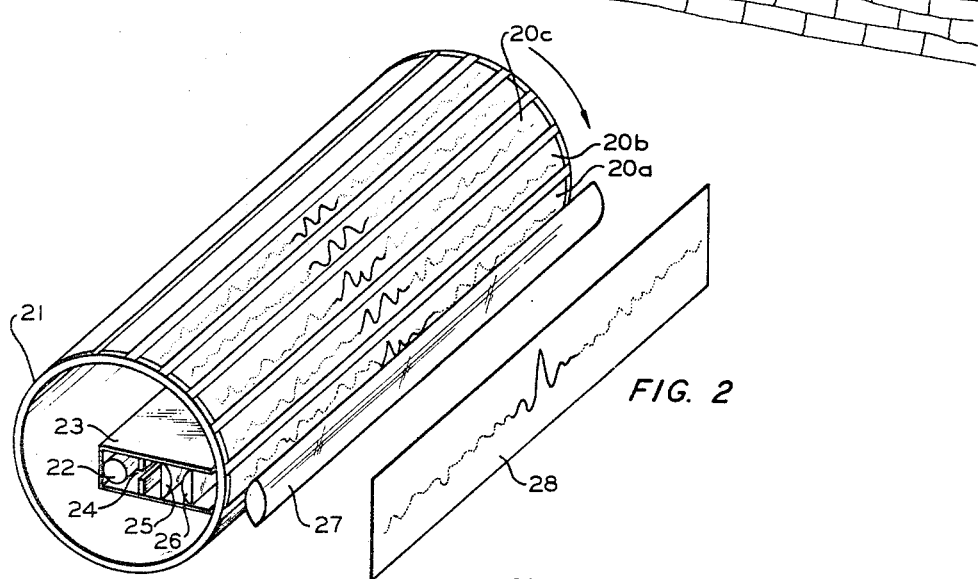
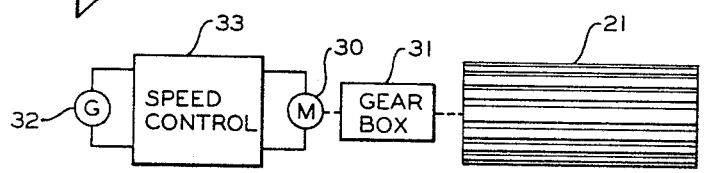
FIG. 3
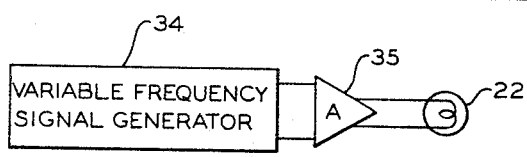
FIG. 4

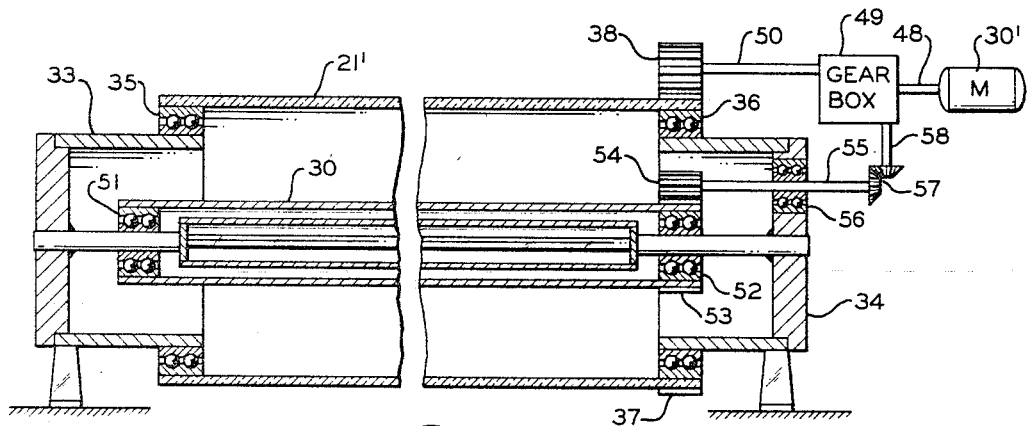
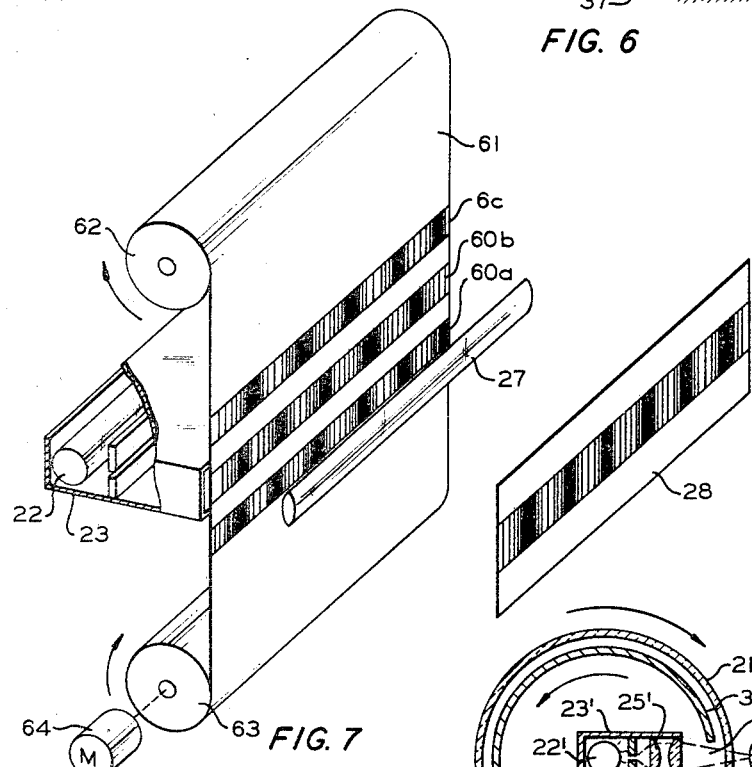
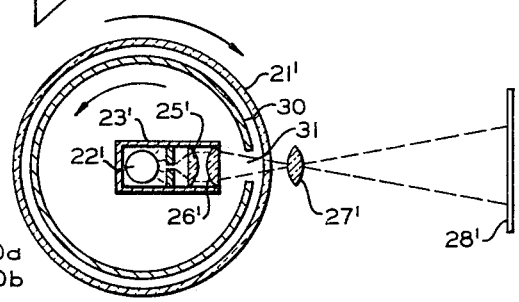
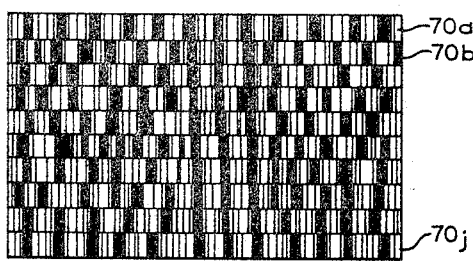
INVENTORS
D.G. STERRY
J.P. LINDSEY

3,427,111
SIGNAL CORRELATION
Dan G. Sterry and Joe P. Lindsey, Bartlesville, Okla., assignors to Phillips Petroleum Company, a corporation of Delaware
Filed Oct. 21, 1964, Ser. No. 405,501
U.S. Cl. 356—256                        2 Claims
Int. Cl. G02b 27/32; G01r 23/16; G01v 1/00

ABSTRACT OF THE DISCLOSURE

Signals to be compared, such as seismic signals, are represented by films, the light transmission properties of which vary as functions of the signals. A plurality of these films are moved sequentially into a beam of light at a speed greater than the retention time of the human eye. The resulting transmitted light beam thus provides a visual indication of the correlation between the signals. In one embodiment, the films are mounted on a rotatable drum which has a light source at the center.

---

This invention relates to the measurement of the degree of correlation between signals.

In the field of geophysical prospecting, it is common practice to impart vibrations to the earth at a first location and to record at a second location vibrations which have traveled through the earth and have been reflected from subterranean formations. A comparison of the times of arrival of these reflected vibrations in a plurality of records can provide valuable information regarding the nature of subterranean reflecting beds. However, the recognition of these reflected vibrations is often obscured by random noise vibrations which are also received at the second locations. In many areas, these noise vibrations are of such magnitude as to obscure the desired reflections. Various procedures have been employed to aid in the recognition of reflections in the presence of random noise. Many of these procedures involve the addition of a plurality of signals, whereby common reflections are magnified in amplitude. Noise vibrations that occur at random times tend to cancel one another.

This invention provides novel procedures for summing a plurality of records so that common information contained therein can readily be identified. The individual records are established on films or plates so that the light transmission properties of such film or plates are representative of the signals recorded thereon. An optical system is provided so that a plurality of films or plates to be compared are sequentially positioned in a beam of light. The speed at which the individual films or plates are positioned in the beam of light is greater than the retention time of the human eye. Thus, the transmitted light is viewed by an observer as the composite of the light transmission properties of a plurality of records. It has been found that the human eye is able to distinguish common patterns by this procedure with a higher degree of accuracy than is possible by conventional correlation procedures.

Accordingly, it is an object of this invention to provide a novel method of comparing seismic records.

Another object is to provide apparatus for use in measuring the degree of correlation between a plurality of signals.

Other objects, advantages and features of the invention should become apparent from the following detailed description, taken in conjunction with the accompanying drawing in which:

FIGURE 1 is a schematic representation of a seismic exploration system to which the present invention is applicable.

FIGURE 2 is a schematic representation of a first embodiment of the signal correlation apparatus of this invention.

FIGURE 3 is a schematic representation of the mechanism employed to rotate the drum assembly of FIGURE 2.

FIGURE 4 is a schematic representation of a system for energizing the light source of FIGURE 2.

FIGURE 5 is a schematic sectional view of a second embodiment of the apparatus of this invention.

FIGURE 6 is a view, shown partially in section, of the supporting and drive mechanism associated with the apparatus of FIGURE. 5

FIGURE 7 is a schematic view of a third embodiment of the apparatus of this invention.

FIGURE 8 is a view of a form of signal reproduction which can be employed in accordance with the procedure of this invention.

Referring now to the drawing in detail and to FIGURE 1 in particular, there is shown a schematic representation of a seismic exploration system which is commonly referred to as a "common reflection point" system. Explosive charges are first detonated in sequence in a plurality of shot holes 10, 11 and 12. Seismometers 13, 14 and 15 measure vibrations which are received at the locations illustrated. The measured vibrations are transmitted to a suitable multi-channel recorder 16. If the distances between adjacent shot points are approximately equal to the distances between adjacent detectors, it can be seen that the recorded vibrations include reflections from a common region 17 of a subterranean reflecting bed 18. If the detected signals are added, after being displaced relative to one another to compensate for different lengths of travel path and other static corrections, the resulting composite signals emphasize the common reflections, with random noise vibrations being minimized. In actual practice, a much larger number of signals are combined for each common reflecting point. Vibration detectors are normally positioned on each side of the shot holes so that a plurality of signals are obtained from each explosive charge. The foregoing procedure is then repeated to obtain reflections from a number of different regions in the subterranean reflecting bed. For example, shots can be fired at locations 10′, 11′ and 12′ and vibrations measured at locations 13′, 14′ and 15′. By comparing the resulting composite signals from a plurality of reflecting areas, it is possible to map the contour of subterranean reflecting bed.

The first step in the compositing procedure involves adding the reflections received by detectors 13, 14 and 15. Since the illustrated reflection received at detector 15 travels a longer path than do the reflections received by detectors 13 and 14, it is necessary to displace the records relative to one another in order than the common reflections will occur at the same time. This is generally a trial and error procedure because the depth of the reflecting bed and the velocity of transmission through the earth generally are not known with any degree of accuracy. The apparatus of this invention is particularly useful in determining the necessary displacement needed for addition the individual signals.

The signals established by detectors 13, 14 and 15 are employed to form optical records representative of the detected vibrations. These recordings can be made, for example, by displacing a light beam on a photographic film by amounts proportional to the amplitudes of the received vibrations. Such records can be produced by employing the seismometer outputs to displace a mirror carried by a galvanometer. The mirror reflects a light beam on a photographic film. A second method of representing the signals is by variable density recording. In such a system, the amplitudes of the detected vibrations can be employed to control the intensity of a light beam which is directed on a photographic film. The opacity of the resulting developed film will thus vary as a function of the amplitudes of the received vibrations.

As illustrated in FIGURE 2, films 20a, 20b, 20c, etc. thus produced are mounted on the surface of a rotatable drum 21. Each individual film represents the vibrations received by one of the seismometers of FIGURE 1. Drum 21 is adapted to be rotated by a motor, hereinafter described. A lamp 22 is positioned within a housing 23 inside drum 21, and a slit 24 is formed adjacent lamp 22. A pair of condensing lenses 25 and 26 establish a beam of light which is transmitted outwardly through drum 21. A projecting lens 27 is positioned externally of the drum to focus the transmitted light on a screen 28. When drum 21 is rotated, the individual films are successively moved onto the light beam so as to be projected in sequence on screen 28.

As illustrated in FIGURE 3, drum 21 can be rotated by a motor 30, the drive shaft of which is connected through a suitable gear box 31 to drum 21. Motor 30 is actuated from a source of electrical energy 32. A suitable speed control mechanism is employed to drive motor 30 at the desired speed. As illustrated in FIGURE 4, lamp 22 is energized periodically by the output signal from a variable frequency signal generator 34. This generator, which can be an audio frequency oscillator, is connected to the input of an amplifier 35, which is employed if needed. The output signal from the amplifier energizes lamp 22. The speed of rotation of drum 21 and the frequency of energization of lamp 22 are adjusted so that the lamp is energized each time a film on drum 21 is positioned in the light beam. This frequency is greater than the retention time of the human eye, generally higher than 25 cycles per second, for example. Thus, the image observed on screen 28 represents a composite of two or more adjacent films on drum 21.

As illustrated schematically in FIGURE 2, the various recorded signals contain common reflections near the centers of the films. The remainder of the vibrations are random. When the individual films are aligned on drum 21 such that the common reflections occur at the same location, the image positioned on screen 28 emphasizes the common signal. The remainder of the vibrations occur at random times and tend to cancel one another to give a blur. Thus, by adjusting the positions of the individual films on drum 21 relative to one another, it is possible to align the several films so that the common reflections are superimposed. This can readily be accomplished by mounting the films in slots so that they can be moved relative to one another. A light beam transmitted through drum 21 and the films so aligned can then be employed to expose another photographic film in place of screen 28 so as to provide a record which represents the composite of the individual signals. This procedure can be repeated for each reflecting location on formation 18. The resulting composite signals thus obtained can in turn be compared to measure the relative times of occurrence of the common reflections from bed 18. By noting the relative displacements of the individual films when maximum alignment has occurred, it is possible to determine the slope of bed 18.

A second embodiment of the apparatus of this invention is illustrated schematically in FIGURES 5 and 6. This apparatus is similar to that shown in FIGURE 2 except that lamp 22' is operated continuously rather than intermittently. A shutter is employed in this embodiment so that a light beam is transmitted each time a different film is positioned in the light path. The shutter can be provided by rotating a hollow cylinder 30, which has a longitudinal slit 31 therein, within drum 21'.

Suitable support and drive mechanism for drum 21' and cylinder 30 are illustrated in FIGURE 6. The entire assembly is supported by stationary members 33 and 34. Drum 21' is mounted by respective bearing assemblies 35 and 36. A spur gear 37 is mounted on one end of drum 21' so as to be engaged by a spur gear 38. The drive shaft 48 of motor 30' is connected through a gear box 49 to a shaft 50 which carries spur gear 38. Cylinder 30 is supported on the frame members by bearing assemblies 51 and 52, and carries a spur gear 53 on one end. Gear 53 meshes with a spur gear 54 which is attached to a shaft 55. Shaft 55 is supported by a bearing assembly 56 in frame 34, and is connected to gear box 49 by gears 57 and a shaft 58. Gear box 49 is of such configuration that cylinder 30 is rotated at a greater speed than is drum 21'. The speeds of the two elements are adjusted so that slit 31 in cylinder 30 makes one revolution each time an adjacent film on drum 21' moves into the light beam. Obviously the two cylinders can be rotated in the same or opposite directions.

A third embodiment of the apparatus of this invention is illustrated in FIGURE 7. In place of a rotating drum the individual signals are formed as segments 60a, 60b and 60c on a film 61. Film 61 extends from a supply reel 62 to a take-up reel 63, the latter being driven by a motor 64. This apparatus is similar to a conventional movie projector in that each segment of film 61 represents a frame of the film. As illustrated in FIGURE 7, the signals are shown as being variable density recordings. When common information is contained at the same location in a plurality of individual segments, the resulting image is either a maximum or a minimum. Noise vibrations tend to cancel one another to provide substantially constant illumination.

In the interpretation of seismic signals, composite records are often made wherein vibrations received at a plurality of adjacent regions are transformed into signals which are positioned adjacent one another. The observer then attempts to recognize common events in the composite record. FIGURE 8 represents a section of such a composite record wherein ten individual signals 70a, 70b . . . 70j are positioned side by side. This particular section may represent only a portion of a much larger composite record. The overall record can be divided into individual segments such as shown in FIGURE 8. Each such segment can then form one of the signals to be compared by the apparatus of this invention. By displaying a plurality of such segments in sequence by any of the apparatus described, an operator can observe common events as moving slowly across screen 28.

Although this invention is particularly useful in interpreting seismic signals, it should be evident that the same procedure can be employed to measure common information in any type of signals which can be represented on films wherein the light transmission properties of the films are representative of the signals. As employed herein, the term film is intended to mean any type of optical element containing data, whether flexible or rigid. In the interpretation of seismic signals, the method of this invention can be employed for any type of exploration procedure wherein it is desirable to measure the correlation between different signals.

While this invention has been described in conjunction with presently preferred embodiments, it should be evident that it is not limited thereto.

What is claimed is:

1. The method of observing common information in a plurality of seismic signals which comprises exposing a plurality of films as functions of the seismic signals to be compared so that the light transmission properties of each of the films vary as functions of respective seismic signals giving a graphic representation, directing beams of light along a common path at a preselected frequency, and successively moving said films into said path so that a light beam is transmitted successfully through each of the films, said preselected frequency and the speed of movement of said films being sufficiently great than an observer of the beams of light transmitted through the films is not able to distinguish one film from the next, whereby a composite optical presentation of said graphic representation is established by the transmitted beams of light.

2. The method of claim 1 wherein the speed of movement of said films into said path is such that consecutive films enter said path at a frequency greater than 25 cycles per second.

References Cited

UNITED STATES PATENTS

| | | | |
|---|---|---|---|
| 2,084,915 | 6/1937 | Leitch | 40—77 |
| 2,167,460 | 7/1939 | Mathes. | |
| 2,463,534 | 3/1949 | Hawkins. | |
| 2,671,375 | 3/1954 | Boucher | 88—14 |
| 2,707,524 | 5/1955 | Montgomery | 346—33 |
| 2,296,141 | 9/1942 | Brown et al. | 352—101 X |
| 2,913,954 | 11/1959 | Morgan | 352—2 |
| 3,039,022 | 6/1962 | D'Arcy | 352—200 X |

FOREIGN PATENTS 497,694   9/1954   Italy.

JEWELL H. PEDERSEN, *Primary Examiner.*

A. A. KASHINSKI, *Assistant Examiner.*

U.S. Cl. X.R.

324—77; 340—15.5